US012694869B2

(12) United States Patent
Welcome et al.

(10) Patent No.: US 12,694,869 B2
(45) Date of Patent: Jul. 28, 2026

(54) SYSTEMS AND METHODS FOR ADVANCED VOICE MONITORING AND ANALYSIS

(71) Applicant: State Farm Mutual Automobile Insurance Company, Bloomington, IL (US)

(72) Inventors: Anthony Welcome, Mesa, AZ (US); Kimberly C. Kloeppel, Mesa, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 113 days.

(21) Appl. No.: 18/597,683

(22) Filed: Mar. 6, 2024

(65) Prior Publication Data

US 2024/0312453 A1 Sep. 19, 2024

Related U.S. Application Data

(60) Provisional application No. 63/490,938, filed on Mar. 17, 2023.

(51) Int. Cl.
| | |
|---|---|
| *G10L 15/04* | (2013.01) |
| *G10L 15/06* | (2013.01) |
| *G10L 15/18* | (2013.01) |
| *G10L 15/22* | (2006.01) |
| *G10L 15/30* | (2013.01) |
| *G10L 25/63* | (2013.01) |
| *H04M 3/51* | (2006.01) |
| *G10L 15/08* | (2006.01) |

(52) U.S. Cl.
CPC ........ *G10L 15/1822* (2013.01); *G10L 15/063* (2013.01); *G10L 15/22* (2013.01); *G10L 15/30* (2013.01); *G10L 25/63* (2013.01); *H04M 3/5133* (2013.01); *G10L 2015/088* (2013.01)

(58) Field of Classification Search
CPC ... G10L 15/1822; G10L 15/063; G10L 15/22; G10L 15/30; G10L 25/63; G10L 2015/088; G10L 15/26; G10L 15/04; G10L 15/05; H04M 3/5133; H04M 3/5175
See application file for complete search history.

(56) References Cited

U.S. PATENT DOCUMENTS

| | | | |
|---|---|---|---|
| 9,596,349 B1 | 3/2017 | Hernandez | |
| 11,461,788 B2 * | 10/2022 | Jones | ............. G06Q 10/063112 |

(Continued)

FOREIGN PATENT DOCUMENTS

| | | |
|---|---|---|
| CA | 2043290 A1 | 12/1991 |
| CN | 109767791 A | 5/2019 |

(Continued)

*Primary Examiner* — Abul K Azad
(74) *Attorney, Agent, or Firm* — Armstrong Teasdale LLP

(57) ABSTRACT

A computer system is provided and is programmed to: (1) receive an audible caller statement originating from a caller being routed to the representative; (2) parse the audible caller statement; (3) identify one or more key words from the parsed audible caller statement; (4) search an information database for one or more items of information based upon the one or more key words; (5) identify at least one of the one or more items of information to present to the representative; and (6) transmit the at least one identified items of information to be presented to the representative.

20 Claims, 6 Drawing Sheets

(56) References Cited

U.S. PATENT DOCUMENTS

| | | | |
|---|---|---|---|
| 2004/0030541 A1* | 2/2004 | Chou | G09B 7/02 |
| | | | 704/2 |
| 2008/0091612 A1 | 4/2008 | Witecha | |
| 2012/0320905 A1* | 12/2012 | Ilagan | H04L 65/1069 |
| | | | 370/352 |
| 2017/0084272 A1* | 3/2017 | Flaks | H04M 3/5175 |

FOREIGN PATENT DOCUMENTS

| | | | |
|---|---|---|---|
| EP | 1361738 A1 | 11/2003 | |
| WO | 2008098128 A1 | 8/2008 | |

* cited by examiner

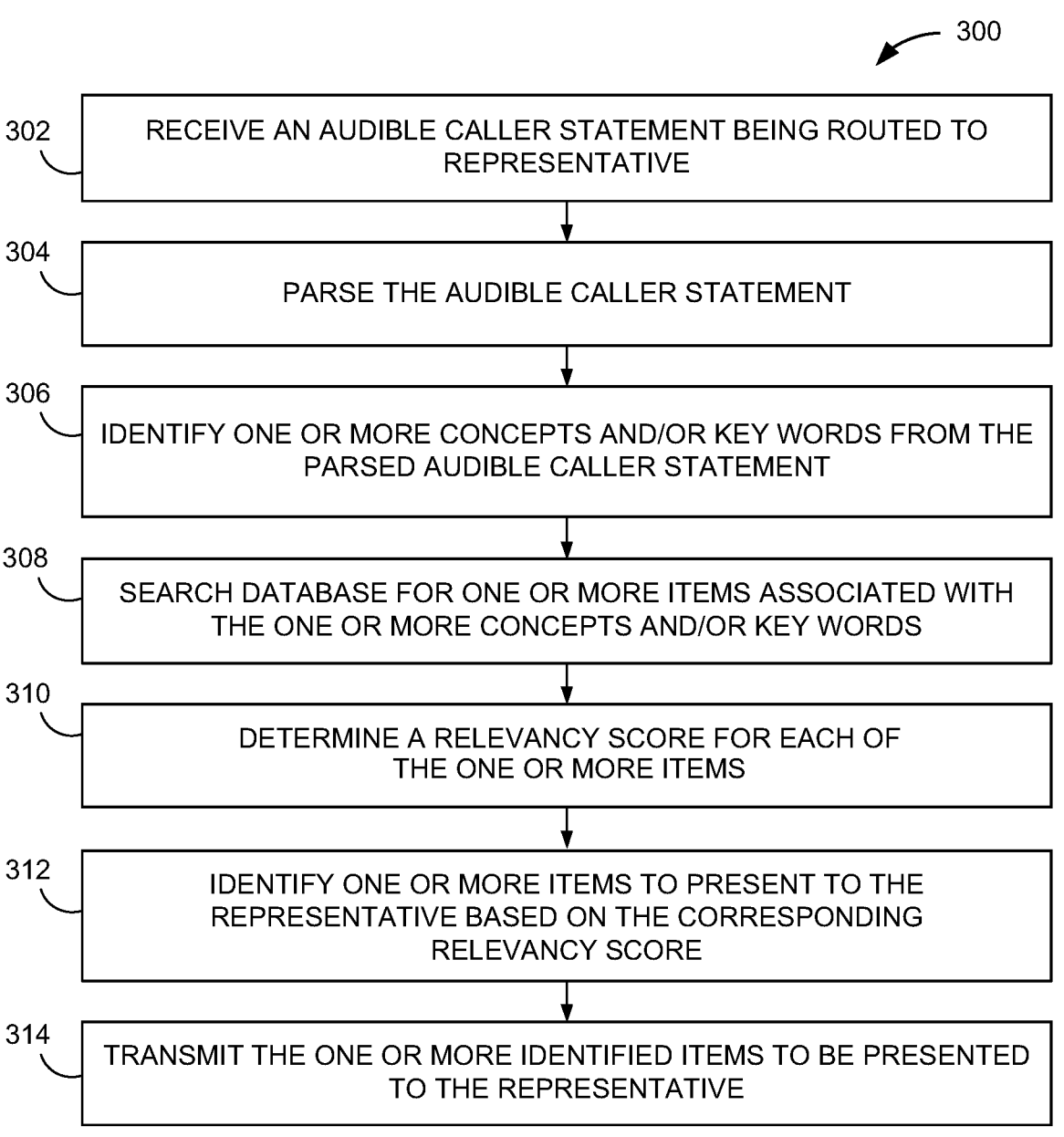

300

302 — RECEIVE AN AUDIBLE CALLER STATEMENT BEING ROUTED TO REPRESENTATIVE

304 — PARSE THE AUDIBLE CALLER STATEMENT

306 — IDENTIFY ONE OR MORE CONCEPTS AND/OR KEY WORDS FROM THE PARSED AUDIBLE CALLER STATEMENT

308 — SEARCH DATABASE FOR ONE OR MORE ITEMS ASSOCIATED WITH THE ONE OR MORE CONCEPTS AND/OR KEY WORDS

310 — DETERMINE A RELEVANCY SCORE FOR EACH OF THE ONE OR MORE ITEMS

312 — IDENTIFY ONE OR MORE ITEMS TO PRESENT TO THE REPRESENTATIVE BASED ON THE CORRESPONDING RELEVANCY SCORE

314 — TRANSMIT THE ONE OR MORE IDENTIFIED ITEMS TO BE PRESENTED TO THE REPRESENTATIVE

FIGURE 3

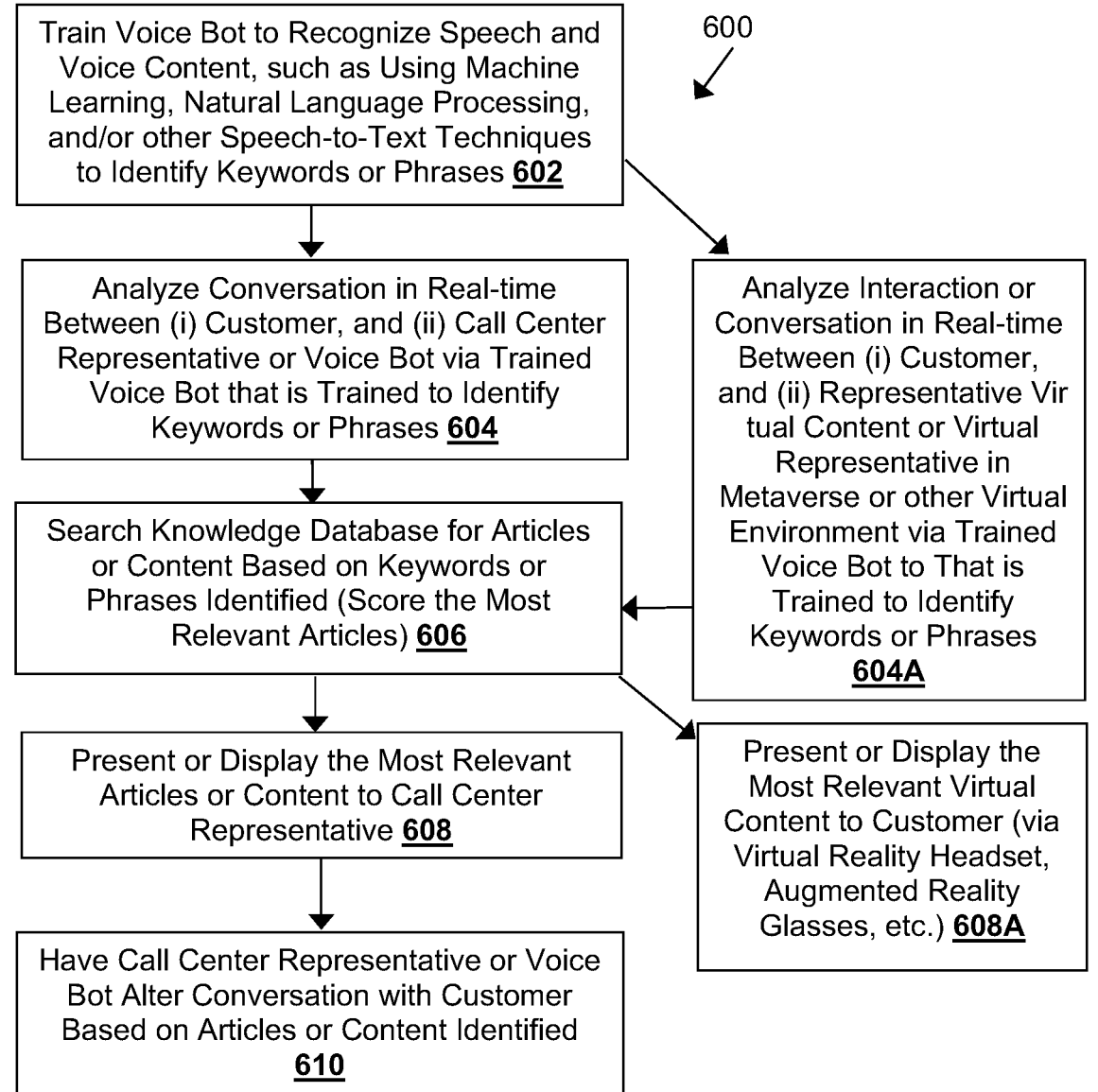

Train Voice Bot to Recognize Speech and Voice Content, such as Using Machine Learning, Natural Language Processing, and/or other Speech-to-Text Techniques to Identify Keywords or Phrases 602

600

Analyze Conversation in Real-time Between (i) Customer, and (ii) Call Center Representative or Voice Bot via Trained Voice Bot that is Trained to Identify Keywords or Phrases 604

Analyze Interaction or Conversation in Real-time Between (i) Customer, and (ii) Representative Virtual Content or Virtual Representative in Metaverse or other Virtual Environment via Trained Voice Bot to That is Trained to Identify Keywords or Phrases 604A

Search Knowledge Database for Articles or Content Based on Keywords or Phrases Identified (Score the Most Relevant Articles) 606

Present or Display the Most Relevant Articles or Content to Call Center Representative 608

Present or Display the Most Relevant Virtual Content to Customer (via Virtual Reality Headset, Augmented Reality Glasses, etc.) 608A

Have Call Center Representative or Voice Bot Alter Conversation with Customer Based on Articles or Content Identified 610

FIGURE 6

SYSTEMS AND METHODS FOR ADVANCED VOICE MONITORING AND ANALYSIS

CROSS-REFERENCE TO RELATED APPLICATIONS

This application claims priority to U.S. Provisional Patent Application No. 63/490,938, filed Mar. 17, 2023, entitled "SYSTEMS AND METHODS FOR ADVANCED VOICE MONITORING AND ANALYSIS," the entire contents and disclosures of which are hereby incorporated herein by reference in their entirety.

FIELD OF THE DISCLOSURE

The present disclosure relates to monitoring and analyzing speech, and more particularly, to a network-based system and method for electronically monitoring and analyzing audio data to provide relevant information from knowledge databases.

BACKGROUND

Chatbots may be used, for example, to answer questions, obtain information from, and/or process requests from a user. In many cases, these chatbots may be used to handle phone calls. In some of these cases, interacting with a chatbot may be irritating to the callers. In some cases, callers may feel like they must repeat themselves to be understood, or they may be placed in a loop of responses which makes them feel like they are not getting where they need to be in the system. This may lead to the point where the caller continues to repeat themselves and they quickly want to talk to a real person.

In many cases, a live representative that handles customer support or is otherwise responsible for other customer interactions may have to provide information about a large number of different topics to a caller. In taking time to look up materials associated with the caller's reason for calling may make the representative look unknowledgeable or rude for not paying attention to the call. Additionally, the representative may have to put the caller on hold to look up the relevant information. Furthermore, rarely used data files may have been renamed, moved, or otherwise become difficult for the representative to locate quickly in the computer system they may be using. Conventional techniques may have other efficiencies, encumbrances, ineffectiveness, and/or drawbacks as well.

BRIEF SUMMARY

The present embodiments may generally relate to, inter alia, systems and methods that allow a representative to more quickly look-up, be presented, and/or access relevant information without ignoring the caller and/or potentially putting the caller on hold. More specifically, the present systems and methods may provide for electronically monitoring and analyzing audio data (e.g., conversations) to provide relevant information from knowledge databases. The system may include a conversation monitoring and analysis (CMA) computer system and/or one or more user computer devices. In one aspect, the present embodiments may be configured to monitor real-time conversations and provide relevant items of information (in either visual, textual, audible, or other digestible formats) in real-time. For instance, with the present embodiments, a system is provided that can understand complex statements and provide relevant information in response thereto.

In one aspect, a system for electronically monitoring and analyzing audio data may be provided. The system may include a computing device that may include at least one processor in communication with at least one memory device. The computer device may be in communication with a user device associated with a representative servicing a caller. The at least one processor may be configured to: (1) receive data representing an audible caller statement that originates from a caller having been routed to the representative; (2) parse the audible caller statement; (3) electronically identify one or more key words from the parsed audible caller statement; (4) initiate a key word search within a reference database for one or more items of information based upon the one or more key words; (5) identify at least one of the one or more items of information to present to the representative; and/or (6) transmit the at least one identified items of information to be presented to the representative via the user device. The system may include additional, less, or alternate functionality, including that discussed elsewhere herein.

In another aspect, a computer-implemented method for monitoring and analyzing conversations may be provided. The computer-implemented method may be performed by a conversation monitoring and analysis (CMA) computer device including at least one processor in communication with at least one memory device. The CMA computer device may be in communication with a user computer device associated with a user. The method may include: (1) receiving data representing an audible caller statement that originates from a caller having been routed to the representative; (2) parsing the audible caller statement; (3) electronically identifying one or more key words from the parsed audible caller statement; (4) initiating a key word search within a reference database for one or more items of information based upon the one or more key words; (5) identifying at least one of the one or more items of information to present to the representative via the user device; and/or (6) transmitting the at least one identified items of information to be presented to the representative. The computer-implemented method may include additional, less, or alternate actions, including those discussed elsewhere herein.

In another aspect, at least one non-transitory computer-readable media having computer-executable instructions embodied thereon may be provided. When executed by a computing device including at least one processor in communication with at least one memory device and in communication with a user device associated with a representative, the computer-executable instructions may cause the at least one processor to: (1) receive data representing an audible caller statement that originates from a caller having been routed to the representative; (2) parse the audible caller statement; (3) electronically identify one or more key words from the parsed audible caller statement; (4) initiate a key word search within a reference database for one or more items of information based upon the one or more key words; (5) identify at least one of the one or more items of information to present to the representative via the user device; and/or (6) transmit the at least one identified items of information to be presented to the representative. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 3 illustrates an exemplary process of electronically monitoring and analyzing data representative of audio conversations to provide relevant information from knowledge databases using the system shown in FIG. 1.

FIG. 6 illustrates a flow chart of an exemplary process for customer voice analysis for searching a knowledge/article/content database.

Figure 1:
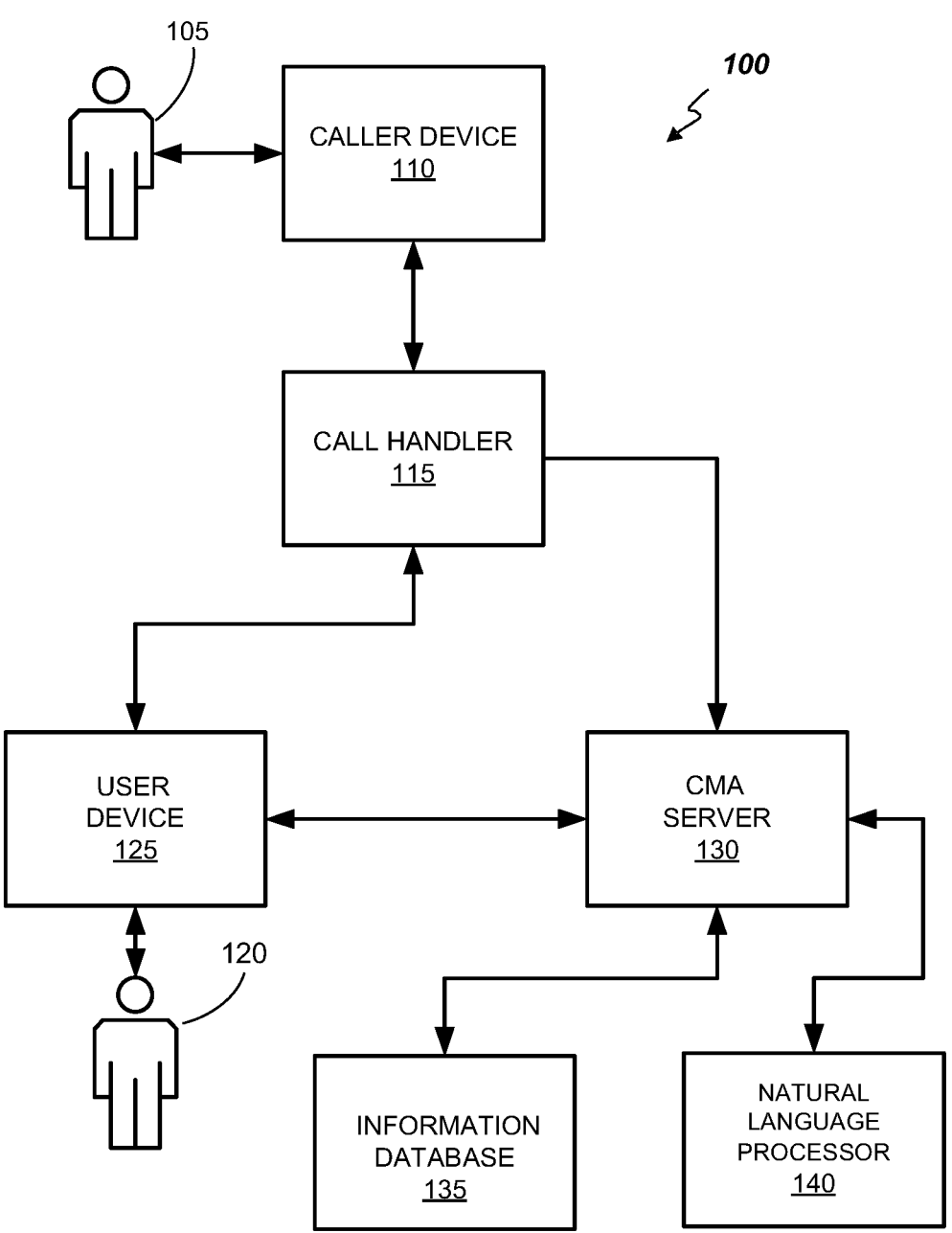
FIG. 1 illustrates a simplified block diagram of an exemplary computer system for electronically monitoring and analyzing data representative of audio conversations to provide relevant information from knowledge databases in accordance with at least one embodiment of this disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for parsing multiple intents and, more particularly, to a network-based system and method for electronically monitoring and analyzing data representative of audio conversations using natural language speech analysis to identify key words to be used to conduct searches and provide relevant information from knowledge databases. In one exemplary embodiment, the process may be performed by a conversation monitoring and analysis ("CMA") computer device. In the exemplary embodiment, the CMA computer device may be in communication with a call handler that routes calls between a caller and a representative who provides help to the caller. In the exemplary embodiment, the CMA computer device may be in communication with a user device associated with the representative or computer device that allows the CMA computer device to communicate with the representative. In the exemplary embodiment, the CMA computer device may also be in communication with a reference or information database. The information database may provide information about different topics that may be of concern to the caller.

The representative may use the information in the information database to help the caller resolve an issue or reason for their call. For example, if the caller is calling for tech support, the information database may include instructions for specific steps for the caller to perform to resolve the caller's issue and/or help to diagnose the caller's issue. The representative may use these steps provided in the information database to help the caller.

In the exemplary embodiment, the CMA computer device may receive data representative of an audio conversation between a caller and a representative in real-time. The CMA computer device receives the audio statements made by the caller and the representative in real-time as the audio statements are streamed to the CMA computer device from the call handler. In real-time and/or near real-time, the CMA computer device parses the audio statements to determine the intent and/or concepts behind the audio statements. In some embodiments, the CMA computer device may be in communication with a natural language processor to parse the audio statements.

In real-time and/or near real-time, the CMA computer device then uses the intent and/or concepts to determine one or more items of information in the information database to assist the representative. In some embodiments, the items of information may include, but are not limited to, scripts, articles, checklists, descriptions, how to guides, and/or other information as needed. Then the CMA computer device may provide the determined one or more items to the representative in real-time and/or near real-time. For example, the CMA computer device may cause the item and/or a link to the item to be displayed on the screen of the representative's computer device.

In some of these embodiments, the CMA computer device may determine a relevance score for each retrieved item and only provide retrieved items that exceed a predetermined threshold. The relevance score may indicate how relevant each item retrieved is to the translated audio file. Relevancy may be determined based upon the number of associations between one or more key words and the items in the information database. Furthermore, these associations may be updated by the representative in real-time based upon the representative's feedback.

In some further embodiments, the representative may provide feedback as to whether the item is relevant to the caller's inquiry or issue. For example, the representative may provide the feedback as a thumb up or thumb down as to whether the item was relevant to the call. For instance, in one call, the representative may say "Good afternoon, my name is Bob. How may I help you today?" The caller may then reply with "I am having trouble logging into my computer/account. It says that my password is wrong." The CMA computer device may parse the statements to determine that the issue may be related to passwords. The CMA computer device may then search the database to find three potential options for relevant item. The CMA computer device calculates a relevance score for each item. A first item may have an 80% relevancy score, a second item has a 10% relevancy score, and a third item has a 30% relevancy score.

In one embodiment, the CMA computer device may determine that only the first article exceeds the relevancy threshold and only provides that first article to the representative. In another embodiment, the CMA computer device may provide a predetermined number of items to the representative and include the corresponding relevancy scores. For example, the CMA computer device provides the three items with the highest relevancy scores. The representative may then provide an thumbs up or down to each item. The CMA computer device then uses the feedback to improve the searches and/or relevancy scoring for future calls. This feedback is taken into account when future relevancy scores are calculated.

In the exemplary embodiment, a caller may use their caller device (e.g., a mobile phone or other computing device with telephone call capabilities including voice over internet protocol (VOIP)) to place a phone call. The CMA computer device may receive the phone call and interpret the user's speech. In other embodiments, the CMA computer device may be in communication with a phone system computer device, where the phone system computer device receives the phone call and transmits the audio to the CMA computer device. In the exemplary embodiment, the CMA computer device may be in communication with one or more computer devices that are being used by representatives that are speaking to the caller. In one example, the caller may be placing a phone call to order a pizza. The additional computer devices may be capable of providing additional information to the representative, such as an account associated with the phone number and caller preferences.

In the exemplary embodiment, an audio stream may be received by the CMA computer device via a websocket. In some embodiments, the websocket may be opened by the phone system computer device. In real-time, the CMA computer device may use speech to text natural language processing to interpret the audio stream. In the exemplary embodiment, the CMA computer device may interpret the translated text of the speech. When the CMA computer device detects a long pause, the CMA computer device may determine if the long pause is the end of a statement or the end of the user talking.

If the pause is the end of a statement, the CMA computer device may flag (or tag) the text as a statement and may process the statement. The CMA computing device may further identify pauses within the statement and identify portions of the statement between the pauses as utterances. The CMA computer device may identify the caller intent by having a model of utterances and keywords that is capable of identifying the intents of the statement. The CMA computer device may extract data (e.g., a meaning of the utterance) from the identified intents.

If the pause is the end of the caller's talking, the CMA computer device may process the caller's statements (also known as the user's turn). The CMA computer device may also process the caller's statements in real-time to provide the items of information quickly to the representative. The CMA computer device may sort and prioritize all of the intents based upon stored business logic and pre-requisites.

In some further embodiments, the caller may state their name. This may be in response to a prompt from the representative. The CMA computer device may parse the caller's audible statement to retrieve their name. Then the CMA computer device transmits the parsed name to the representative's computer device to be displayed on a screen to the representative. The representative can then either accept the name from the CMA computer device, ask the caller for clarification, and/or correct the provided name. In some embodiments, the caller may state an account number. The CMA computer device may parse the audibly stated account number, look-up the account number in the database, and provide account information to the representative, rather than requiring the representative to type in the account number. For example, the caller may be asking or providing information about an insurance policy and the account is the insurance policy.

In still additional embodiments, the CMA computer device may determine a portion of the retrieved item that is relevant to the conversation between the caller and the representative. For example, the retrieved item may have information about changing passwords on different systems, i.e., iOS and Android. The CMA computer device may determine that the caller has an iOS device and provide the item to the representative so that the item opens to the corresponding section, the corresponding section is highlighted, and/or there is a bookmark at the corresponding section of the item.

While the above describes the audio translation of speech, the systems described herein may also be used for interpreting text-based communication with a user, such as through a text-based chat program. In some embodiments, the CMA computer device monitors the chat with the caller/user and provides relevant items of information to the representative.

In additional embodiments, the CMA computer system may be monitoring audible statements provided through a virtual reality system. For example, the caller is using virtual reality and/or augmented reality to communicate with the representative and the CMA computer system provides the items of information to be provided to the representatives through one or more virtual reality devices.

In still further embodiments, the CMA computer system may also analyze pitch, tone, inflection, words used, and/or phrases to determine a current mood and/or sentiment of the caller. The CMA computer system may then provide that analysis of current mood/sentiment to the representative to help the representative communicate with the caller. For example, the CMA computer device may determine that the caller is angry and inform the representative that there is a 60% chance that the caller is angry. The CMA computer system may then provide one or two items of information on how to assist an angry caller. Furthermore, the CMA computer system may analyze a plurality of calls between callers and representatives to determine the sentiments of different callers, how those moods/sentiments changed over the call, and what the representative did to cause those changes to moods/sentiments. The CMA computer system may then provide that changing mood/sentiment information to improve representative training.

Furthermore, the CMA computer system may then use that changing mood/sentiment information to provide information to the representative to assist in their call with the caller. This information may include suggestions on how to respond and what terms to use to response. These responses would also include the associated help data items that the representative would be providing to the caller. In some embodiments, a user interface would be provided to show both the proposed responses and the needed data. Furthermore, the representative may be able to provide feedback on how the steps worked and any comments from the caller for future reference.

At least one of the technical problems addressed by this system may include: (i) unsatisfactory user experience when interacting with a chatbot application; (ii) inability of a computing device to automatically identify appropriate information to assist user; (iii) inability of a representative to efficiently find appropriate information to assist user; (iv)

providing the user with additional methods of providing information; and/or (v) inefficiency in parsing and routing data to assist user.

A technical effect of the systems and processes described herein may be achieved by performing at least one of the following steps: (i) receiving an audible caller statement being routed to the representative; (ii) parsing the audible caller statement; (iii) identifying one or more key words from the parsed audible caller statement; (iv) searching an information database for one or more items of information based upon the one or more key words; (v) identifying at least one of the one or more items of information to present to the representative; and/or (vi) transmitting the at least one identified items of information to be presented to the representative.

The technical effect achieved by this system may be at least one of: (i) improved user experience when interacting with a chatbot application; (ii) improved user experience when interacting with a representative; (iii) reduced call time required to assist user; (iv) improved user experience; (v) reduced need for direct user/chatbot interaction; (vi) increased efficiency in retrieving data requested by a user via a chatbot application; and/or (vii) increased efficiency in generating speech responses to statements submitted by a user via a chatbot application.

Exemplary System for Monitoring and Analyzing Conversations

FIG. 1 illustrates a simplified block diagram of an exemplary computer system 100 for electronically monitoring and analyzing data representative of audio conversations to provide relevant information from knowledge databases in accordance with at least one embodiment of this disclosure.

In the exemplary embodiment, a caller 105 is a user who places a call through a caller device 110. In some embodiments, the caller device 110 is a phone. In other embodiments, the caller device 110 is a computer device that places the call through an application and/or a voice over IP (VOIP) connection. In at least some embodiments, caller devices 110 may be computers that include a web browser or a software application, which enables caller devices 110 to access remote computer devices, such as the call handler 115, using the Internet or other network. More specifically, caller devices 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Caller devices 110 may be any device capable of accessing the Internet including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, voice bots, ChatGPT bots or ChatGPT-based bots, or other web-based connectable equipment or mobile devices.

In some embodiments, the voice bots or chatbots discussed herein may be configured to utilize AI and/or ML techniques. For instance, the voice bot or chatbot may be a ChatGPT chatbot. The voice bot or chatbot may employ supervised or unsupervised machine learning techniques, which may be followed or used in conjunction with reinforced or reinforcement learning techniques. The voice bot or chatbot may employ the techniques utilized for ChatGPT. The voice bot or chatbot may deliver various types of output for user consumption in certain embodiments, such as verbal or audible output, a dialogue output, text or textual output (such text or graphics presented on a computer or mobile device screen or display), visual or graphical output, and/or other types of outputs.

In the exemplary embodiment, calls from the caller device 110 connect to a call handler 115. A call handler 115 is a server for routing incoming calls to representatives 120 via their user devices. In some embodiments, the call handler 115 is a VOIP server that routes audio streams between the caller device 110 and the user device 125. In some embodiments, the call handler 115 requests some information from the caller, such as via an automated menu. This information may be provided by a keyboard or other input device of the caller device 110. This information may also be provided audibly by the caller 105 via the caller device 110. For example, the call handler 115 may audibly request that the caller 105 state their name, enter or say their account number, or may one or more menu selections before connecting the caller 105 to a representative 120. The call handler 115 may then provide that information to the representative 120 via the user device 125. In still further embodiments, the call handler 115 keeps the caller 105 on hold until a representative 120 is available.

In the exemplary embodiment, call handler 115 may be a computer that includes a web browser or a software application, which enables call handler 115 to access remote computer devices, such as a plurality of caller devices 110, a plurality of user devices 125 and/or a CMA server 130, using the Internet or other network. More specifically, call handler 115 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Call handler 115 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, the system 100 includes a plurality of call handlers 115 to handle calls from a plurality of caller devices 110.

In the exemplary embodiment, each representative 120 corresponds to a user device 125. The user device 125 allows the representative 120 to communicate with the caller 105 via their caller device 110. In the exemplary embodiment, user devices 125 may be computers that include a web browser or a software application, which enables user devices 125 to access remote computer devices, such as the call handler 115, using the Internet or other network. More specifically, user devices 125 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User devices 125 may be any device capable of accessing the Internet including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, or other web-based connectable equipment or mobile devices.

In the exemplary embodiment, a call monitor and analysis ("CMA") server 130 is in communication with the call handler 115. The call handler 115 provides audio streams from caller devices 110 and user devices 125 to the CMA server 130. The CMA server 130 is configured to parse the audio streams to determine statements, keywords, intents, moods, and/or sentiments expressed by the caller 105 and/or the representative 120. In the exemplary embodiment, the CMA server 130 is in communication with one or more reference or information databases 135. The information databases 135 include a plurality of items of information including, but not limited to, scripts, articles, checklists, descriptions, how to guides, and/or other information as needed. The CMA server 130 searches the information database 135 for relevant items of information and provides those items of information to the representative 120 via the user device 125 during the conversation between the caller 105 and the representative 120. The CMA server 130 may also be in communication with a natural language processor 140 that provides speech to text services and translates audible statements into text for the CMA server 130 to analyze. The representative 120 may use these steps provided in the information database 135 to help the caller 105.

In the exemplary embodiment, CMA server 130 may be a computer that includes a web browser or a software application, which enables CMA server 130 to access remote computer devices, such as a plurality of user devices 125 and/or the call handler 115, using the Internet or other network. More specifically, the CMA server 130 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The CMA server 130 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, the system 100 includes a plurality of call handlers 115 to handle calls from a plurality of caller devices 110. In some embodiments, the call handler 115 and the CMA server 130 may be separate. In other embodiments, the call handler 115 and the CMA server 130 may be combined into a single device.

In one embodiment, information database 135 may include scripts, articles, checklists, descriptions, how to guides, and/or other information as needed. In the exemplary embodiment, information database 135 may be stored remotely from CMA server 130. In some embodiments, information database 135 may be decentralized. In the exemplary embodiment, a user may access information database 135 via a user computer device (not shown) by logging onto the CMA server 130, as described herein.

In the exemplary embodiment, the natural language processor 140 may be a computer that includes a web browser or a software application, which enables natural language processor 140 to access remote computer devices, such as CMA server 130, using the Internet or other network. More specifically, the natural language processor 140 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The natural language processor 140 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiments, natural language processor 140 provides speech to text translation services. In some further embodiments, the natural language processor 140 may also provide text to speech services as needed. In some embodiments, the natural language processor 140 and the CMA server 130 may be separate. In other embodiments, the natural language processor 140 and the CMA server 130 may be combined into a single device. In some further embodiments, the natural language processor 140 provides close captioning of the caller's audio input to the representative 120 to assist the representative in understanding the caller 105.

Exemplary Process for Monitoring and Analyzing Conversations

Figure 2:
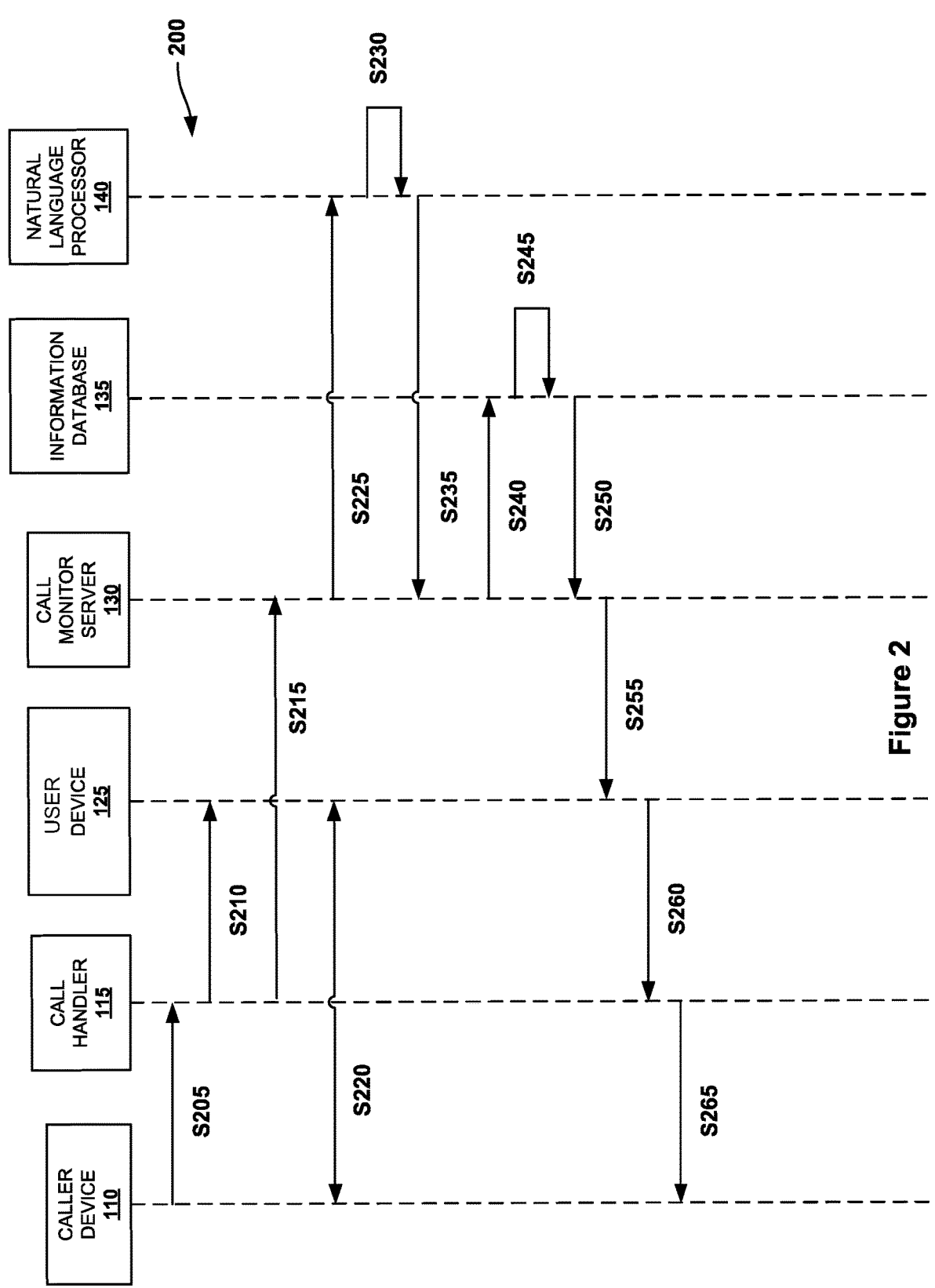
FIG. 2 illustrates a timing chart of an exemplary process of electronically monitoring and analyzing data representative of audio conversations to provide relevant information from knowledge databases using the system shown in FIG. 1.

FIG. 2 illustrates a timing chart of an exemplary process 200 of electronically monitoring and analyzing data representative of audio conversations to provide relevant information from knowledge databases using the system 100 (shown in FIG. 1).

In the exemplary embodiment, the caller device 110 provides S205 audio input from the caller 105 (shown in FIG. 1) to the call handler 115. In some embodiments, the audio input is provided S205 via a phone call. In other embodiments, the audio input is provided S205 via an application through the Internet, such as VOIP.

The call handler 115 routes S210 the audio input to the user device 125 of the representative 120 (shown in FIG. 1) that is handling the call from the caller 105. The call handler 115 also routes S215 a copy of the audio input to the CMA server 130. For the duration of a conversation S220 between the caller 105 and the representative 120, the call handler 115 routes audio inputs between the caller device 110 and the user device 125, while transmitting copies of the audio inputs to the CMA server 130.

While the conversation S220 occurs, the CMA server 130 transmits S225 the audio input to the natural language processor 140. The natural language processor 140 acts as a speech to text translator and translates S230 the audio input into text. The natural language processor 140 returns S235 the text to the CMA server 130. Then the CMA server 130 uses the provided text to search S240 one or more reference or information databases 135 to determine S245 relevant information based upon the text of the conversation S220. The CMA server 130 retrieves S250 the relevant information from the information database 135. The CMA server 130 provides S255 to the user device 125, to assist the representative 120 with their conversation S220 with the caller 105. The representative 120 may use these steps provided in the information database 135 to help the caller 105. The relevance score may indicate how relevant each item retrieved is to the translated audio file. Relevancy may be determined based upon the number of associations between one or more key words and the items in the information database. Furthermore, these associations may be updated by the representative in real-time based upon the representative's feedback.

In some embodiments, the CMA server 130 uses text to determine the intent and/or concepts being conveyed by the caller 105 to determine one or more items of information in the information database 135 to assist the representative 120. In some embodiments, the items of information may include, but are not limited to, scripts, articles, checklists, descriptions, how to guides, and/or other information as needed. Then the CMA server 130 may provide S255 the determined one or more items to the representative 120 via the user device 125. For example, the CMA server 130 may cause the item and/or a link to the item to be displayed on the screen of the representative's computer device. 125

In some of these embodiments, the CMA server 130 may determine a relevance score for each retrieved item and only provide retrieved items that exceed a predetermined threshold. In some further embodiments, the representative 120 may provide feedback as to whether or not the item is relevant to the caller's inquiry or issue. For example, the representative 120 may provide the feedback as a thumb up or thumb down as to whether the item was relevant to the conversation S220. For example, in one call, the representative 120 may say "Good afternoon, my name is Bob. How may I help you today?" The caller 105 may then reply with "I am having trouble logging into my computer/account. It says that my password is wrong." The CMA server 130 may parse the statements to determine that the issue may be related to passwords. The CMA server 130 may then search the database 135 to find three potential options for relevant item. The CMA server 130 calculates a relevance score for each item. A first item may have an 80% relevancy score, a second item has a 10% relevancy score, and a third item has a 30% relevancy score.

In one embodiment, the CMA server 130 may determine that only the first article exceeds the relevancy threshold and only provides that first article to the user device 125. In another embodiment, the CMA server 130 may provide a predetermined number of items to the representative and include the corresponding relevancy scores. For example, the CMA server 130 provides the three items with the highest relevancy scores. The representative 120 may then provide an thumbs up or down to each item. The CMA server 130 then uses the feedback to improve the searches and/or relevancy scoring for future calls. The CMA server 130 may provide any number of items for each statement, keyword, concept, intent, and/or idea based upon one or more settings, such as user preferences. The CMA server 130 may limit the number of provided items based upon one or more limits to prevent overloading the representative 120 with too much information.

In the exemplary embodiment, an audio input may be received by the CMA server 130 via a websocket. In some embodiments, the websocket may be opened by the phone system computer device. In real-time, the CMA server 130 may use speech to text natural language processing to interpret the audio stream, such as through the natural language processor 140. In the exemplary embodiment, the CMA server 130 may interpret the translated text of the speech. When the CMA server 130 detects a long pause, the CMA server 130 may determine if the long pause is the end of a statement or the end of the caller 105 or representative talking.

If the pause is the end of a statement, the CMA server 130 may flag (or tag) the text as a statement and may process the statement. The CMA server 130 may further identify pauses within the statement and identify portions of the statement between the pauses as utterances. The CMA server 130 may identify the caller intent by having a model of utterances and keywords that is capable of identifying the intents of the statement. The CMA server 130 may extract data (e.g., a meaning of the utterance) from the identified intents.

In some further embodiments, the caller 105 may state their name. This may be in response to a prompt from the representative 120. The CMA server 130 may parse the caller's audible statement to retrieve their name. Then the CMA server 130 transmits the parsed name to the representative's computer device to be displayed on a screen to the representative 120 via the user device 125. The representative 120 can then either accept the name provided by the CMA server 130, ask the caller 105 for clarification, and/or correct the provided name. In some embodiments, the caller 105 may state an account number. The CMA server 130 may parse the audibly stated account number, look-up the account number in the database 135, and provide account information to the representative 120, rather than requiring the representative 120 to type in the account number. For example, the caller 105 may be asking or providing information about an insurance policy and the account is the insurance policy.

In still additional embodiments, the CMA server 130 may determine a portion of the retrieved item that is relevant to the conversation S220 between the caller 105 and the representative 120. For example, the retrieved item may have information about changing passwords on different systems, i.e., iOS and Android. The CMA server 130 may determine that the caller has an iOS device and provide the item to the representative 120 so that the item opens to the corresponding section, the corresponding section is highlighted, and/or there is a bookmark at the corresponding section of the item.

In additional embodiments, the CMA server 130 may be monitoring audible statements provided through a virtual reality system. For example, the caller 105 is using virtual reality and/or augmented reality to communicate with the representative 120 and the CMA server 130 provides the items of information to be provided to the representatives 120 through one or more user devices 125 that are virtual reality devices.

While the above describes the audio translation of speech, the systems 100 described herein may also be used for interpreting text-based communication with a user, such as through a text-based chat program. In some embodiments, the CMA server 130 monitors the chat with the caller/user 105 and provides relevant items of information to the representative 120.

In still further embodiments, the CMA server 130 may also analyze pitch, tone, inflection, words used, and/or phrases to determine a current mood and/or sentiment of the caller 105. The CMA server 130 may then provide that analysis of current mood/sentiment to the representative 120 to help the representative 120 communicate with the caller 105. For example, the CMA server 130 may determine that the caller 105 is angry and inform the representative 120 that there is a 60% chance that the caller 105 is angry. The CMA server 130 may then provide one or two items of information on how to assist an angry caller 105.

Furthermore, the CMA server 130 may analyze a plurality of calls between callers 105 and representatives 120 to determine the sentiments of different callers 105, how those moods/sentiments changed over the call, and what the representative 120 did to cause those changes to moods/sentiments. The CMA server 130 may then provide that changing mood/sentiment information to improve representative 120 training.

Additionally, the CMA server 130 may then use that changing mood/sentiment information to provide information to the representative 120 to assist in their call with the caller 105. This information may include suggestions on how to respond and what terms to use to respond. These responses would also include the associated help data items that the representative 120 would be providing to the caller 105. In some embodiments, a user interface would be provided to show both the proposed responses and the needed data. Furthermore, the representative 120 may be able to provide feedback on how the steps worked and any comments from the caller 105 for future reference.

Exemplary Process for Monitoring and Analyzing Conversations

FIG. 3 illustrates an exemplary process 300 of electronically monitoring and analyzing data representative of audio conversations to provide relevant information from knowledge databases using the system 100 (shown in FIG. 1). In the exemplary embodiment, process 300 is performed by the CMA server 130 (shown in FIG. 1).

In the exemplary embodiment, the CMA server 130 (also known as the CMA computer device 130 receives 302 an audible caller statement originating from a caller 105 being routed to the representative 120 (both shown in FIG. 1). In some embodiments, the CMA computer device 130 receives 302 the audible caller statement from the call handler 115, while the call handler 115 also forwards the audible call statement to the user device 125 (shown in FIG. 1) to be presented to the representative 120. In other embodiments, the CMA server 130 receives 302 the audible caller statement from the caller device 110 (shown in FIG. 1). In still further embodiments, the CMA server 130 receives 302 the audible caller statement from the user device 125.

In the exemplary embodiment, the CMA server 130 parses 304 the audible caller statement. The CMA server 130 may parse 304 the audible caller statement using natural language processing, such as from a natural language processor 140 (shown in FIG. 1).

In the exemplary embodiment, the CMA server 130 identifies 306 one or more concept and/or key words from the parsed audible caller statement.

In the exemplary embodiment, the CMA server 130 searches 308 an information database 135 for one or more items of information based upon the one or more key words. The items of information may include, but are not limited to, a script, an article, a checklist, a description, and a how to guide.

In the exemplary embodiment, the CMA server 130 determines 310 a relevancy for each of the one or more items. The CMA server 130 identifies at least one of the one or more items to present to the representative 120 based upon the corresponding relevancy score. The CMA server 130 may compare the plurality of relevancy scores to a threshold. The CMA server 130 identify items where the relevancy score exceeds the threshold. For example, the relevancy score threshold may be 80% so that only those items of information with a relevancy score of 80% or greater are presented to the representative 120 via the corresponding user device 125.

In some further embodiments, the CMA server 130 identifies 312 a predetermined number of items of information that exceeds the threshold and has those items presented to the representative 120 via the user device 125. For example, there may be five items of information that exceed the relevancy score threshold. Then the CMA server 130 only identifies 312 the top three items to be presented to the representative 120. In some of these embodiments, the CMA server 130 transmit the corresponding relevancy score with the at least one identified items of information to be presented to the representative.

In the exemplary embodiment, the CMA server 130 identifies 312 at least one of the one or more items of information to present to the representative 120.

In the exemplary embodiment, the CMA server 130 transmits 314 the at least one identified items of information to be presented to the representative 120. The CMA server 130 transmits 314 the at least one identified item of information to a user device 125 associated with the representative 120. In some embodiments, the CMA server 130 may generate instructions to cause the user device to display the at least one identified item of information via a display of the user device 125. Then the CMA server 130 transmits 314 the instructions to the user device 125 associated with the representative 120.

In some additional embodiments, the CMA server 130 may receive feedback from the representative 120 for the at least one identified items of information. For example, the representative 120 may provide a thumbs up/thumbs down rating to show if the corresponding item of information is relevant to the current conversation S220 (shown in FIG. 2). In some of these embodiments, the CMA server 130 may adjust at least one subsequent relevancy score based upon the feedback. The CMA server 130 may change one or more weights for calculating relevancy scores or one or more key words for the corresponding item of information based upon the feedback.

In further embodiments, the CMA server 130 receives one or more audible representative statements. The CMA server 130 parses the received one or more audible representative statements. Then the CMA server 130 may combine the parsed audible representative statements and the parsed audible caller statements to determine a plurality of key word. The CMA server 130 may then determine at least one item of information associated with the plurality of key words.

In additional embodiments, the CMA server 130 may detect a mood of the caller 105 based upon one or more parsed statements. The CMA server 130 may identify the at least one item of information based upon the detected mood of the caller 105. The CMA server 130 may train a model to detect the mood of a caller 105 based upon a plurality of historical conversations between callers 105 and representatives 120.

Exemplary Client Device

Figure 4:
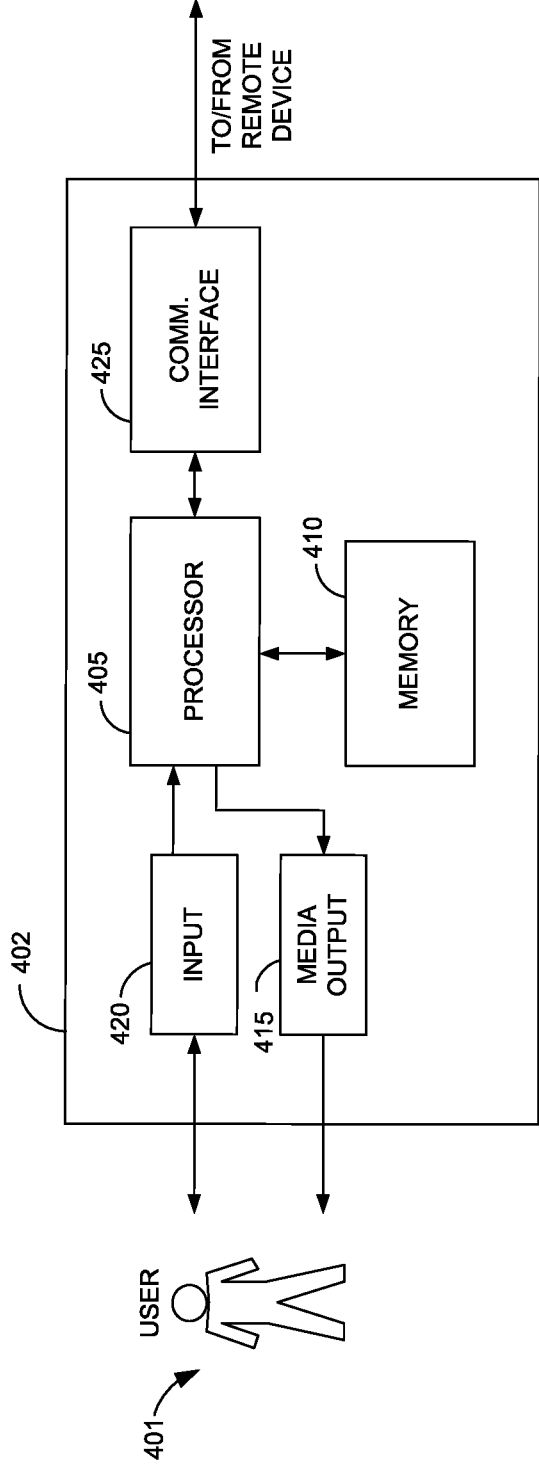
FIG. 4 illustrates an exemplary configuration of a user computer device, in accordance with one embodiment of the present disclosure.

FIG. 4 depicts an exemplary configuration 400 of user computer device 402, in accordance with one embodiment of the present disclosure. In the exemplary embodiment, user computer device 402 may be similar to, or the same as, caller device 110 and user device 125 (both shown in FIG. 1). User computer device 402 may be operated by a user 401.

User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively couplable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for viewing items of information provided by the CMA server 130 (shown in FIG. 1). In some embodiments, user computer device 402 may include an input device 420 for receiving input from user 401. User 401 may use input device 420 to, without limitation, provide information either through speech or typing.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as CMA server 130. Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from CMA server 130. A client application may allow user 401 to interact with, for example, CMA server 130. For example, instructions may be stored by a cloud service, and the output of the execution of the instructions sent to the media output component 415.

Exemplary Server Device

Figure 5:
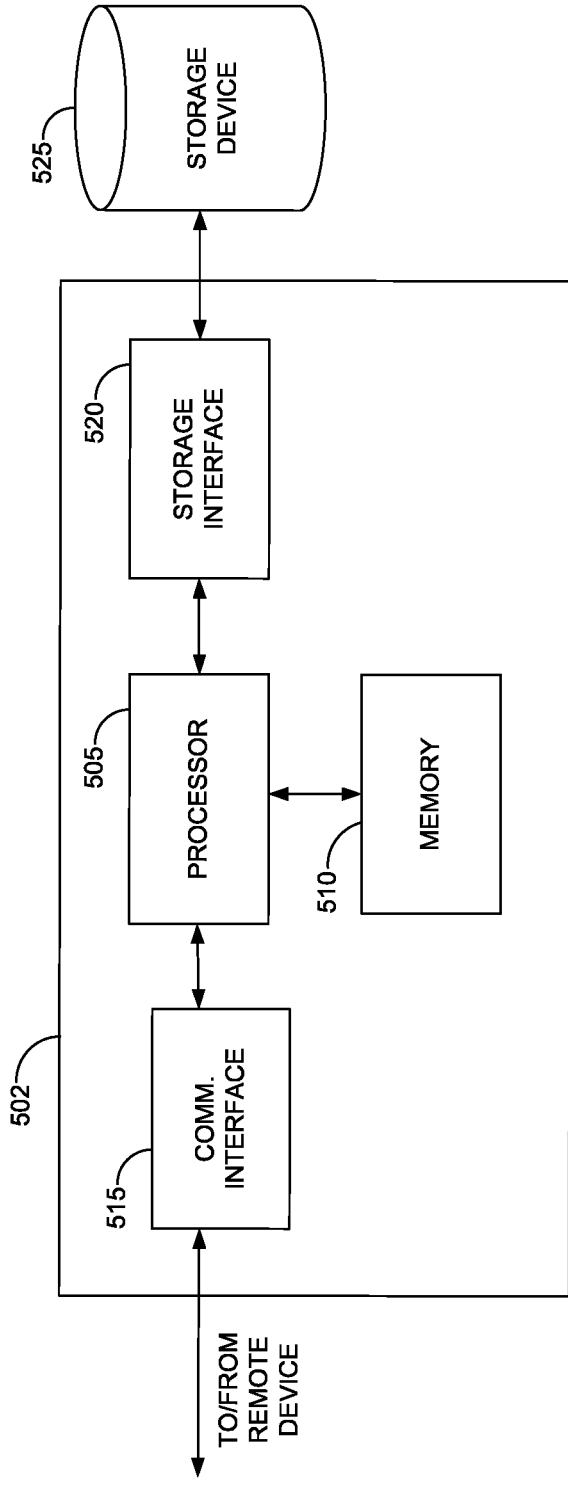
FIG. 5 illustrates an exemplary configuration of a server computer device, in accordance with one embodiment of the present disclosure.

FIG. 5 depicts an exemplary configuration 500 of a server computer device 501, in accordance with one embodiment of the present disclosure. In the exemplary embodiment, server computer device 501 may be similar to, or the same as, call handler 115, CMA server 130, and/or natural language processor 140 (all shown in FIG. 1). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, CMA server 130, user devices 125, and caller devices 110 (both shown in FIG. 1) (for example, using wireless communication or data transmission over one or more radio links or digital communication channels). For example, communication interface 515 may receive audio input from caller devices 110 via the Internet, as illustrated in FIG. 1.

Processor 505 may also be operatively coupled to a storage device 534. Storage device 534 may be any computer-operated hardware suitable for storing and/or retrieving data, such as, but not limited to, data associated with information database 135 (shown in FIG. 1). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid-state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIGS. 2, 3, and 6.

Exemplary Process for Customer Voice Analysis for Searching a Knowledge/Article/Content Database FIG. 6 illustrates a flow chart of an exemplary process 600 for customer voice analysis for searching a knowledge/article/content database, such as the information database 135 (shown in FIG. 1). In the exemplary embodiment, process 600 is performed by one or more of the call handler 115, CMA server 130, and the user device 125 (all shown in FIG. 1).

In the exemplary embodiment, the CMA server 130 trains 602 one or more voice bots to Recognize Speech and Voice Content. This training may be performed by one or more of Machine Learning, Natural Language Processing, and/or other Speech-to-Text Techniques to Identify Keywords or Phrases.

In some embodiments, the CMA server 130 analyzes 604A an interaction or conversation S220 (shown in FIG. 2) in real-time between (i) a customer/caller 105 (shown in FIG. 1), and (ii) virtual content or a virtual representative in the metaverse or other virtual environment via the trained voice bot to that is trained to identify keywords or phrases.

In other embodiments, the CMA server 130 analyzes 604 a conversation S220 in real-time between (i) a customer/caller 105, and (ii) call center representative 120 (shown in FIG. 1) or voice bot via a trained voice bot that is trained to identify keywords or phrases In the exemplary embodiment, the CMA server 130 searches 606 one or more knowledge databases 135 (shown in FIG. 1) for articles or content based upon identified keywords or phrases identified. The CMA server 130 may score the most relevant articles.

In some embodiments, the CMA server 130 presents or displays 608A to the representative 120, via the user device 125, the most relevant virtual content to customer/caller 105.

The relevant content may be presented by, but not limited to, a virtual reality headset, augmented reality glasses, etc.

In other embodiments, the CMA server 130 presents or displays 608 the most relevant articles or content to call center representative 120 via the user device 125.

In the exemplary embodiment, the CMA server 130 instructs 610 the call center representative 120 or voice bot alter their conversation S220 with the customer/caller 105 based upon articles or content identified.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, CMA server 130 is configured to implement machine learning, such that CMA server 130 "learns" to analyze, organize, and/or process data without being explicitly programmed. Machine learning may be implemented through machine learning methods and algorithms ("ML methods and algorithms"). In an exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to speech input statements by user entities. ML outputs may include, but are not limited to: identified utterances, identified intents, identified meanings, generated responses, and/or other data extracted from the input statements. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of conversation data with known characteristics or features. Such information may include, for example, information associated with a plurality of different speaking styles and accents.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

Based upon these analyses, the processing element may learn how to identify characteristics and patterns that may then be applied to analyzing conversation data. For example, the processing element may learn, with the user's permission or affirmative consent, to identify the most commonly used phrases and/or statement structures used by different individuals from different geolocations. The processing element may also learn how to identify attributes of different accents or sentence structures that make a user more or less likely to properly respond to inquiries. This information may be used to determine which how to prompt the user to answer questions and provide data.

In some embodiments, the voice bots or chatbots discussed herein may be configured to utilize AI and/or ML techniques. For instance, the voice bot or chatbot may be a ChatGPT chatbot. The voice bot or chatbot may employ supervised or unsupervised machine learning techniques, which may be followed or used in conjunction with reinforced or reinforcement learning techniques. The voice bot or chatbot may employ the techniques utilized for ChatGPT. The voice bot or chatbot may deliver various types of output for user consumption in certain embodiments, such as verbal or audible output, a dialogue output, text or textual output (such text or graphics presented on a computer or mobile device screen or display), visual or graphical output, and/or other types of outputs.

For the purposes of this discussion, a chatbot or chatterbot is a software application used to conduct an online chat conversation via text or text-to-speech, in lieu of providing direct contact with a live human agent. Chatbots are computer programs that are capable of maintaining a conversation with a user in natural language, understanding their intent, and replying based on preset rules and data. Designed to convincingly simulate the way a human would behave as a conversational partner.

Chatbots are used in dialog systems for various purposes including customer service, request routing, or information gathering. While some chatbot applications use extensive word-classification processes, natural-language processors, and sophisticated AI, others simply scan for general keywords and generate responses using common phrases obtained from an associated library or database.

Most chatbots are accessed on-line via website popups or through virtual assistants. They can be classified into usage categories that include: commerce (e-commerce via chat), education, entertainment, finance, health, news, and productivity.

For the purposes of this discussion, ChatGPT is an artificial intelligence chatbot. It is built on a family of large language models and has been fine-tuned (an approach to transfer learning) using both supervised and reinforcement learning techniques. ChatGPT is a member of the generative pre-trained transformer (GPT) family of language models. It was fine-tuned (an approach to transfer learning) over previous versions. The fine-tuning process leveraged both supervised learning as well as reinforcement learning in a process called reinforcement learning from human feedback (RLHF). Both approaches used human trainers to improve the model's performance. In the case of supervised learning, the model was provided with conversations in which the trainers played both sides: the user and the AI assistant. In the reinforcement learning step, human trainers first ranked responses that the model had created in a previous conversation. These rankings were used to create 'reward models' that the model was further fine-tuned on using several iterations of Proximal Policy Optimization (PPO). Proximal Policy Optimization algorithms present a cost-effective benefit to trust region policy optimization algorithms; they negate many of the computationally expensive operations with faster performance. In addition, chatbots similar to and including ChatGPT continue to gather data from users that could be used to further train and fine-tune the chatbot. Users can upvote or downvote responses they receive from ChatGPT and fill out a text field with additional feedback. The reward model of ChatGPT, designed around human oversight, can be over-optimized and thus hinder performance.

Although the core function of a chatbot is to mimic a human conversationalist, ChatGPT represents a type of chatbot that is versatile. For example, it can write and debug computer programs, compose music, teleplays, fairy tales, and student essays; answer test questions (sometimes, depending on the test, at a level above the average human test-taker); write poetry and song lyrics; emulate a Linux system; simulate an entire chat room; play games like tic-tac-toe; and simulate an ATM. ChatGPT's training data includes many pages and information about internet phenomena and programming languages, such as bulletin board systems and the Python programming language.

Exemplary Embodiments

In one aspect, a computer system may be provided. The system may include at least one processor in communication with at least one memory device. The system may be in communication with a user device associated with a representative. The at least one processor may be configured to: (1) receive data representing an audible caller statement that originates from a caller having been routed to the representative; (2) parse the audible caller statement; (3) electronically identify one or more key words from the parsed audible caller statement; (4) initiate a key word search within a reference database for one or more items of information based upon the one or more key words; (5) identify at least one of the one or more items of information to present to the representative; and/or (6) transmit the at least one identified items of information to be presented to the representative via the user device. The system may include additional, less, or alternate functionality, including that discussed elsewhere herein.

An enhancement of the system may include a processor configured to determine a relevancy score for each of the one or more items. The system may further identify at least one of the one or more items to present to the representative based upon the corresponding relevancy score. The system may additionally compare the plurality of relevancy scores to a threshold and identify items where the relevancy score exceeds the threshold. Moreover the system may identify a predetermined number of items of information that exceeds the threshold. Furthermore, the system may transmit the corresponding relevancy score with the at least one identified items of information to be presented to the representative.

A further enhancement of the system may include a processor configured to transmit the at least one identified item of information to a user device associated with the representative. The system may also generate instructions to cause the user device to display the at least one identified item of information via a display of the user device and transmit the instructions to the user device associated with the representative. The system may further receive feedback from the representative for the at least one identified items of information. Moreover, the system may adjust at least one subsequent relevancy score based upon the feedback.

A further enhancement of the system may include a processor configured to receive one or more audible representative statements and parse the received one or more audible representative statements. The processor may then combine the parsed audible representative statements and the parsed audible caller statements to determine a plurality of key words. The processor may further determine at least one item of information associated with the plurality of key words.

A further enhancement of the system may include a processor configured to detect a mood of the caller based upon one or more parsed statements. The system may also identify the at least one item of information based upon the detected mood of the caller. The system may further train a model to detect the mood of a caller based upon a plurality of historical conversations between callers and representatives.

A further enhancement of the system may include where the items of information include at least one of a script, an article, a checklist, a description, and a how to guide. Additionally or alternatively, a further enhancement of the system may include where the audible caller statement is parsed using natural language processing. Certain embodiments may involve the use of one or more local or remote chatbots, voice bots, ChatGPT-based bots, and/or other bots, which may in wired or wireless communication with the system.

In another aspect, a computer-implemented method may be provided. The computer-implemented method may be performed by a conversation monitoring and analysis (CMA) computer device including at least one processor in communication with at least one memory device. The CMA computer device may be in communication with a user device associated with a representative. The method may include: (1) receiving data representing an audible caller statement that originates from a caller having been routed to the representative; (2) parsing the audible caller statement; (3) electronically identifying one or more key words from the parsed audible caller statement; (4) initiating a key word search within a reference database for one or more items of information based upon the one or more key words; (5) identifying at least one of the one or more items of information to present to the representative; and/or (6) transmitting the at least one identified items of information to be presented to the representative via the user device. The computer-implemented method may include additional, less, or alternate actions, including those discussed elsewhere herein.

An enhancement of the computer-implemented method may include determining a relevancy score for each of the one or more items. The method may further include identifying at least one of the one or more items to present to the representative based upon the corresponding relevancy score. The method may additionally include comparing the plurality of relevancy scores to a threshold and identify items where the relevancy score exceeds the threshold. Moreover the method may include identifying a predetermined number of items of information that exceeds the threshold. Furthermore, the method may include transmitting the corresponding relevancy score with the at least one identified items of information to be presented to the representative.

A further enhancement of the computer-implemented method may include transmit the at least one identified item of information to a user device associated with the representative. The method may also include generating instructions to cause the user device to display the at least one identified item of information via a display of the user device and transmitting the instructions to the user device associated with the representative. The method may further include receiving feedback from the representative for the at least one identified items of information. Moreover, the method may include adjusting at least one subsequent relevancy score based upon the feedback.

A further enhancement of the computer-implemented method may include receiving one or more audible representative statements and parse the received one or more audible representative statements. The method may also include parsing the received one or more audible representative statements. The method may further include combining the parsed audible representative statements and the parsed audible caller statements to determine a plurality of key words. In addition, the method may include determining at least one item of information associated with the plurality of key words.

A further enhancement of the computer-implemented method may include detecting a mood of the caller based upon one or more parsed statements. The method may also include identifying the at least one item of information based upon the detected mood of the caller. The method may further include training a model to detect the mood of a caller based upon a plurality of historical conversations between callers and representatives.

A further enhancement of the computer-implemented method may include where the items of information include at least one of a script, an article, a checklist, a description, and a how to guide. Additionally or alternatively, a further enhancement of the computer-implemented method may include where the audible caller statement is parsed using natural language processing. Certain embodiments may involve the use of one or more local or remote chatbots, voice bots, ChatGPT-based bots, and/or other bots.

In another aspect, at least one non-transitory computer-readable media having computer-executable instructions embodied thereon may be provided. When executed by a computing device including at least one processor in communication with at least one memory device and in communication with a user device associated with a representative, the computer-executable instructions may cause the at least one processor to: (1) receive data representing an audible caller statement that originates from a caller having been routed to the representative; (2) parse the audible caller statement; (3) electronically identify one or more key words from the parsed audible caller statement; (4) initiate a key word search within a reference database for one or more items of information based upon the one or more key words; (5) identify at least one of the one or more items of information to present to the representative; and/or (6) transmit the at least one identified items of information to be presented to the representative via the user device. The computer-executable instructions may direct additional, less, or alternate functionality, including that discussed elsewhere herein.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system comprising at least one processor in communication with at least one memory device, and further in communication with a user device associated with a representative servicing a caller, wherein the at least one processor programmed to:

receive data representing an audible caller statement that originates from a caller having been routed to the representative;

parse the audible caller statement;

electronically identify one or more key words from the parsed audible caller statement;

initiate a key word search within a reference database for one or more items of information based upon the one or more key words;

identify at least one of the one or more items of information to present to the representative via the user device; and transmit the at least one identified items of information to be presented to the representative.

2. The computer system of claim 1, wherein the at least one processor is further programmed to determine a relevancy score for each of the one or more items.

3. The computer system of claim 2, wherein the at least one processor is further programmed to identify at least one of the one or more items to present to the representative based upon the corresponding relevancy score.

4. The computer system of claim 3, wherein the at least one processor is further programmed to:

compare the plurality of relevancy scores to a threshold; and identify items where the relevancy score exceeds the threshold.

5. The computer system of claim 4, wherein the at least one processor is further programmed to identify a predetermined number of items of information that exceeds the threshold.

6. The computer system of claim 2, wherein the at least one processor is further programmed to transmit the corresponding relevancy score with the at least one identified items of information to be presented to the representative.

7. The computer system of claim 1, wherein the at least one processor is further programmed to transmit the at least one identified item of information to a user device associated with the representative.

8. The computer system of claim 7, wherein the at least one processor is further programmed to:

generate instructions to cause the user device to display the at least one identified item of information via a display of the user device; and transmit the instructions to the user device associated with the representative.

9. The computer system of claim 7, wherein the at least one processor is further programmed to receive feedback from the representative for the at least one identified items of information.

10. The computer system of claim 9, wherein the at least one processor is further programmed to adjust at least one subsequent relevancy score based upon the feedback.

11. The computer system of claim 1, wherein the at least one processor is further programmed to:

receive one or more audible representative statements;

parse the received one or more audible representative statements;

combine the parsed audible representative statements and the parsed audible caller statements to determine a plurality of key words; and determine at least one item of information associated with the plurality of key words.

12. The computer system of claim 1, wherein the at least one processor is further programmed to detect a mood of the caller based upon one or more parsed statements.

13. The computer system of claim 12, wherein the at least one processor is further programmed to identify the at least one item of information based upon the detected mood of the caller.

14. The computer system of claim 12, wherein the at least one processor is further programmed to train a model to detect the mood of a caller based upon a plurality of historical conversations between callers and representatives.

15. The computer system of claim 1, wherein the items of information include at least one of a script, an article, a checklist, a description, and a how to guide.

16. The computer system of claim 1, wherein the audible caller statement is parsed using natural language processing.

17. A computer-implemented method performed by a conversation monitoring and analysis (CMA) computer device including at least one processor in communication with at least one memory device, the CMA computer device in communication with a user device associated with a representative servicing a caller, the method comprising:

receiving data representing an audible caller statement that originates from a caller having been routed to the representative;

parsing the audible caller statement;

electronically identifying one or more key words from the parsed audible caller statement;

initiating a key word search within a reference database for one or more items of information based upon the one or more key words;

identifying at least one of the one or more items of information to present to the representative via the user device; and transmitting the at least one identified items of information to be presented to the representative.

18. The computer-implemented method of claim 17 further comprising determining a relevancy score for each of the one or more items.

19. The computer-implemented method of claim 18 further comprising identifying at least one of the one or more items to present to the representative based upon the corresponding relevancy score.

20. At least one non-transitory computer-readable media having computer-executable instructions embodied thereon, wherein when executed by a computing device including at least one processor in communication with at least one memory device and in communication with a user device associated with a representative servicing a caller, the computer-executable instructions cause the at least one processor to:

receive data representing an audible caller statement that originates from a caller having been routed to the representative;

parse the audible caller statement;

electronically identify one or more key words from the parsed audible caller statement;

initiate a key word search within a reference database for one or more items of information based upon the one or more key words;

identify at least one of the one or more items of information to present to the representative via the user device; and transmit the at least one identified items of information to be presented to the representative.

* * * * *